(12) United States Patent
Chou et al.

(10) Patent No.: US 6,717,572 B1
(45) Date of Patent: Apr. 6, 2004

(54) MODULAR ROLLING AXIS APPARATUS

(75) Inventors: Chin-Wen Chou, Hsin-Tien (TW); Tsui-Jung Su, Hsin-Tien (TW); Chien-Hao Su, Hsin-Tien (TW)

(73) Assignee: Shin Jiuh Corp., Taipei Hsien (TW)

( * ) Notice: Subject to any disclaimer, the term of this patent is extended or adjusted under 35 U.S.C. 154(b) by 163 days.

(21) Appl. No.: 10/096,749

(22) Filed: Mar. 14, 2002

(51) Int. Cl.$^7$ .............................. G09G 5/08; G09G 5/00; H01H 21/00
(52) U.S. Cl. .................. 345/157; 345/184; 200/553
(58) Field of Search ................. 345/157, 158, 345/163, 164, 165, 166, 168, 169, 173, 184; 341/35, 192; 74/471 XY; 200/4, 8, 11, 14, 553; 273/148 B

(56) References Cited

U.S. PATENT DOCUMENTS

| | | | |
|---|---|---|---|
| 5,446,481 A | * 8/1995 | Gillick et al. ............... | 345/163 |
| 6,211,474 B1 | * 4/2001 | Takahashi ................... | 200/553 |
| 6,333,473 B1 | * 12/2001 | Sawada et al. ............... | 200/4 |
| 6,555,768 B2 | * 4/2003 | Deruginsky et al. .......... | 200/4 |
| 2002/0158844 A1 | * 10/2002 | McLoone et al. ............ | 345/163 |

* cited by examiner

Primary Examiner—Steven Saras
Assistant Examiner—Paul A. Bell
(74) Attorney, Agent, or Firm—Birch, Stewart, Kolasch & Birch, LLP

(57) ABSTRACT

A modular rolling axis apparatus for installing in a computer peripheral device such as a keyboard, a mouse device, a joystick, a remote controller, a mobile phone, a notebook computer, or a handheld computer or the like consists of a circuit board, two support elements mounting to the circuit board and a rotary rolling axis located between the two support elements. When the rolling axis is driven and depressed, a signal for processing execution or opening of a selected function is output, and processes for execution or opening of the selected function are performed for switching or scrolling viewing pages on the window.

8 Claims, 9 Drawing Sheets

MODULAR ROLLING AXIS APPARATUS

FIELD OF THE INVENTION

The present invention relates to a modular rolling axis apparatus and particularly to a modular rolling axis for installing in computer peripheral devices such as keyboards, mouse devices, joysticks, remote controllers, mobile phones, notebook computers, handheld computers, or the likes.

BACKGROUND OF THE INVENTION

These days mouse devices have gradually replaced keyboards to facilitate users operation when using computers. In the past, a mouse usually includes a rolling ball, a circuit board and a shell. The circuit board has a photo grid rolling axis for controlling X-Y axes displacements, and opening or closing switch buttons. When the rolling ball is rolled, the photo grid-rolling axis is driven to control the cursor to point a selected function button on the window. Then the pushbutton on the shell may be depressed to trigger a switch to execute or open the selected function or switching.

While such mouse devices allow users to use computers easier, mouse operation still has many problems. Hence some producers have developed mouse driver software to control window scrolling or page switching function by depressing the left key, the right key or the middle key to make mouse operation more convenient. Although the mouse driver software are relatively easy to make and may be used without changing the mouse, their function are limited to window scrolling or page switching, and cannot perform switching of function selection.

Some producers also develop and introduce the mouse with a roller. The roller, in addition to controlling window scrolling or page switching, can also be rolled to control switching of function selection and make user operation more convenient. However, such types of mouse devices are more difficult to produce and cost higher, and can only be adapted on mouse, and cannot be adapted for other computer peripheral devices such as keyboards, joysticks, remote controllers, mobile phones, notebook computers, handheld computers, or the likes.

SUMMARY OF THE INVENTION

The primary object of the invention is to resolve aforesaid disadvantages. The invention employs a modular rolling axis apparatus to enable users to process function selection or page switching, then to perform execution or opening of the selected function or window scrolling or page switching by directly depressing the rolling axis apparatus.

Another object of the invention is to provide a small size and light weight rolling axis apparatus for uses in computer peripheral devices such as keyboards, mouse devices, joysticks, remote controllers, mobile phones, notebook computers, handheld computers, or the likes.

In order to achieve the foregoing objects, the rolling axis apparatus of the invention includes a circuit board, two support elements mounted on the circuit board and a rolling axis located between the two support elements. When the rolling axis is driven, one of the support elements can output a coding signal to control function selection or switching on the window. Depressing the rolling axis, a switch in the middle or on two sides may be compressed to deliver an output signal for execution or opening of the selected function to perform execution or opening of the selected function, or page switching or scrolling of the window.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
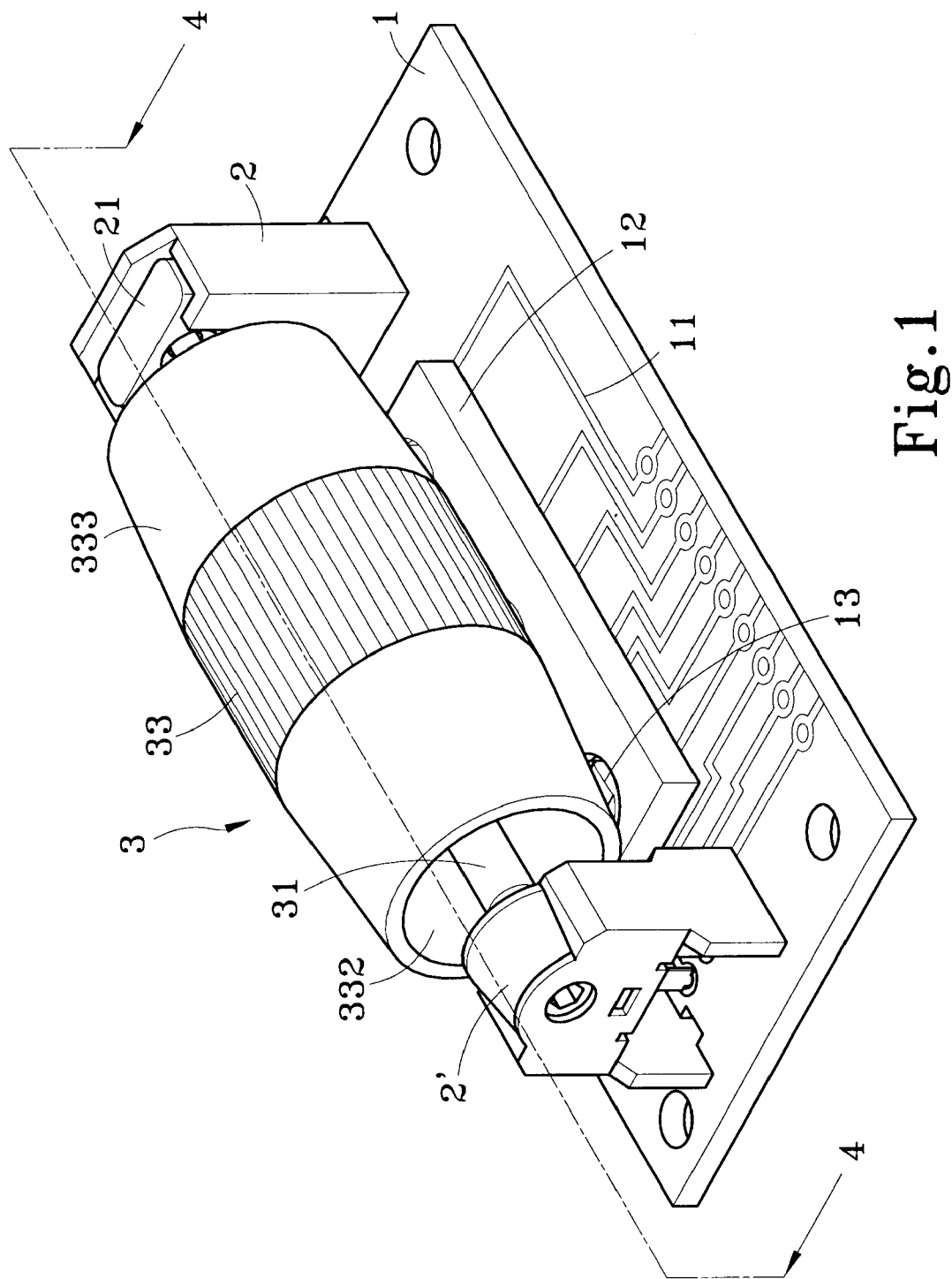
FIG. 1 is a perspective view of the rolling axis apparatus of the invention.
Figure 2:
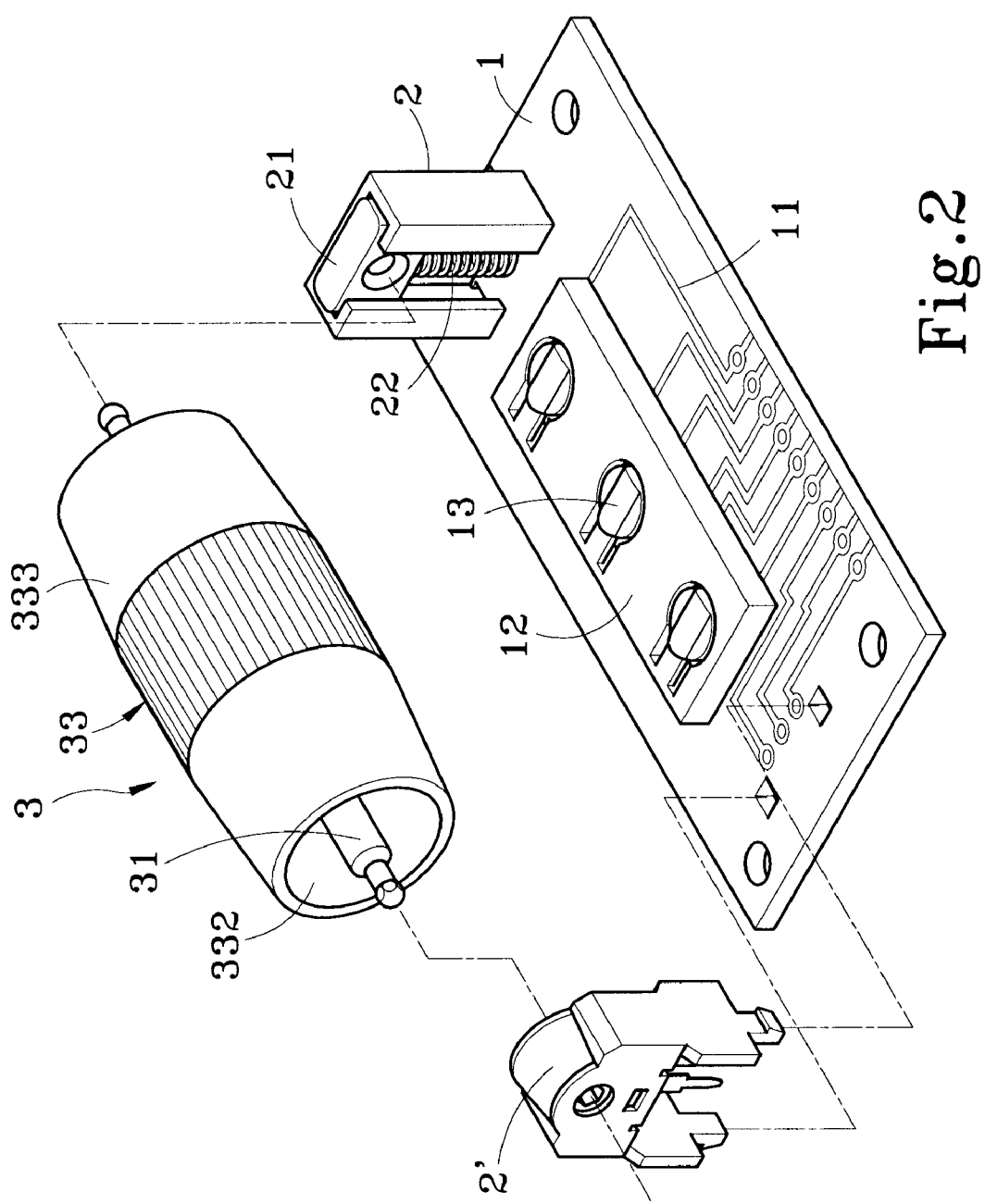
FIG. 2 is an exploded view of the rolling axis apparatus of the invention.
Figure 3:
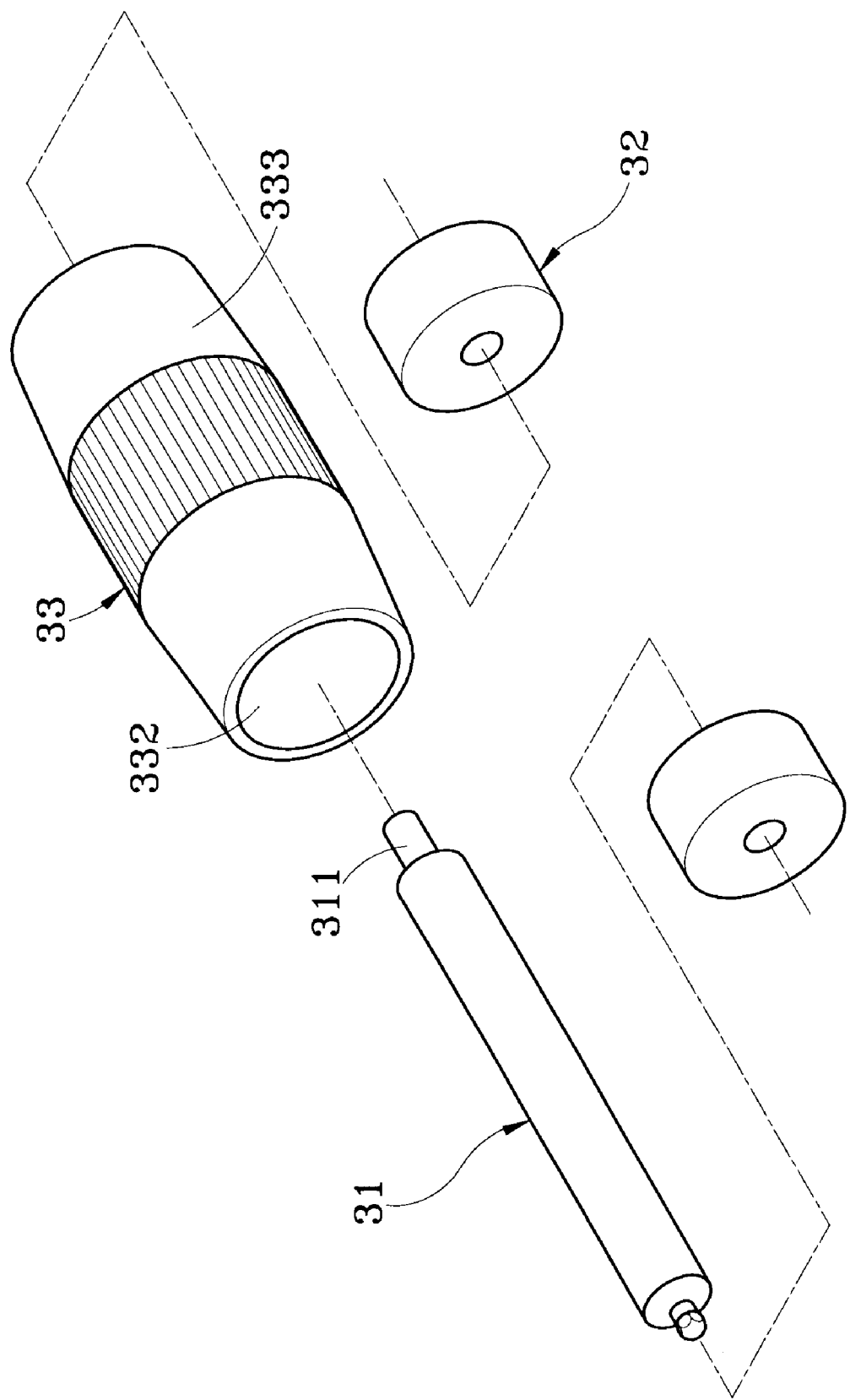
FIG. 3 is a fragmentary exploded view of the rolling axis of the invention.

Referring to FIGS. 1, 2, and 3, the rolling axis apparatus of the invention consists of a circuit board 1, two support elements 2 and 2' mounted to the circuit board 1 and a rolling axis 3 located between the two support elements 2 and 2'. The apparatus may be adopted on a mouse device or a keyboard or the likes for controlling operation of function selection or switching on the window.

The circuit board 1 has a transmission circuit 11 for transmitting signals and a switch seat 12 located on the circuit 11. The switch seat 12 has a plurality of switches 13 connecting to the circuit 11.

Among the two support elements 2 and 2', one is a coding device 2' (which is known in the art, thus details are omitted here), and another support element 2 is hollow and houses a pivotal connection section 21 and a resilient element 22 therein.

Figure 4:
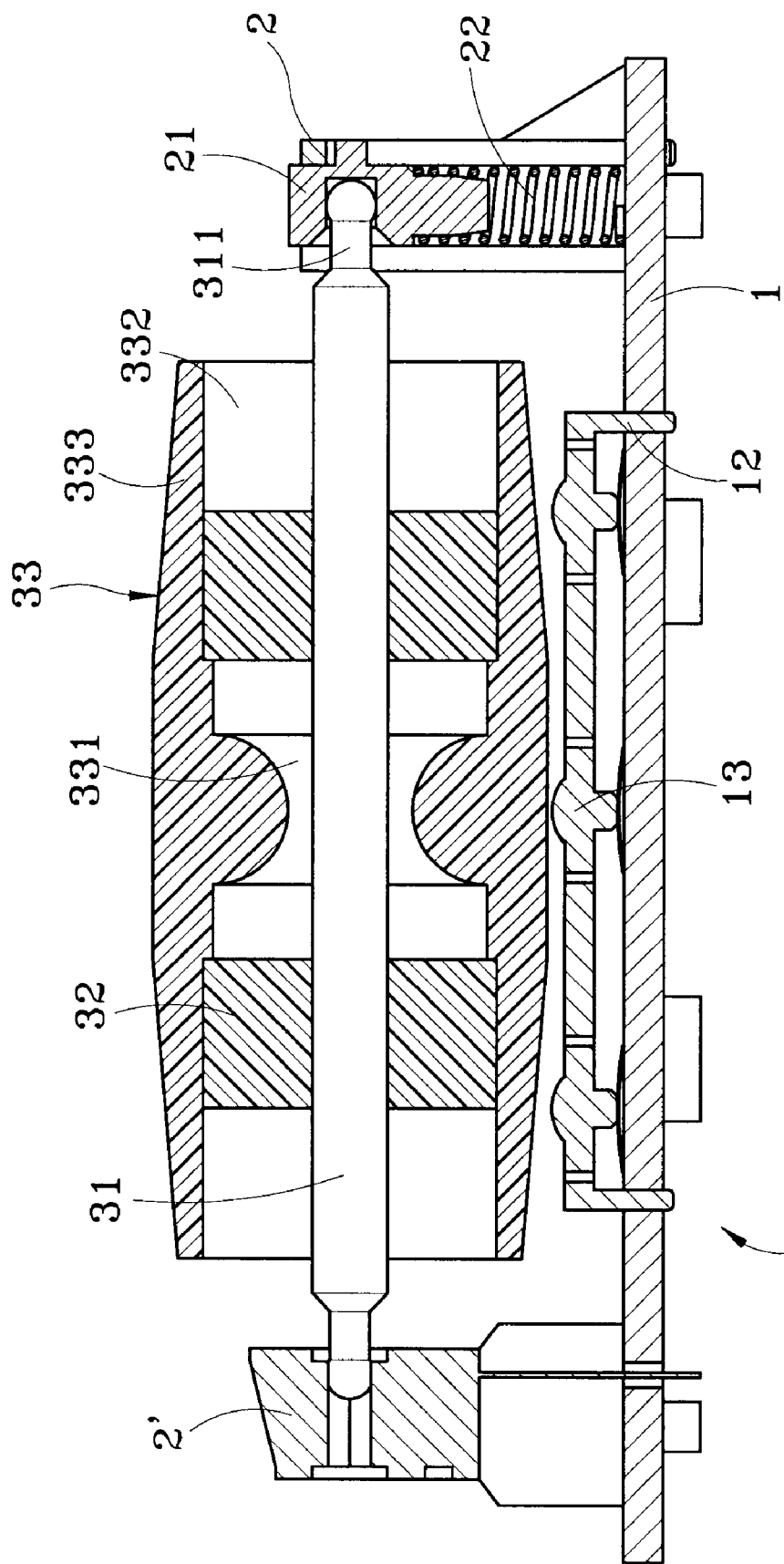
FIG. 4 is a cross section taken along line 4—4 in FIG. 1.

The rolling axis 3 includes an axle 31, two elastic elements (made from rubber or cotton material) 32 coupling with the axle 3, and a sleeve member 33 housing the axle 31 and the elastic elements 32. The axle 31 have two free ends formed respectively a pivotal connection end 311 to pivotally engage with the pivotal connection section 21 and the coding device 2'. The sleeve member 33 has an opening 331 formed in the center thereof to allow the axle 31 to pass through (as shown in FIG. 4). The two elastic elements 32, after coupling with the axle 31, are housed in the sleeve member 33 to form two housing spaces 332 in the sleeve member 33. Two ends of the exterior of the sleeve member 33 are tapered off and form respectively a compression section 333 for depressing the switch seat 12.

Figure 5:
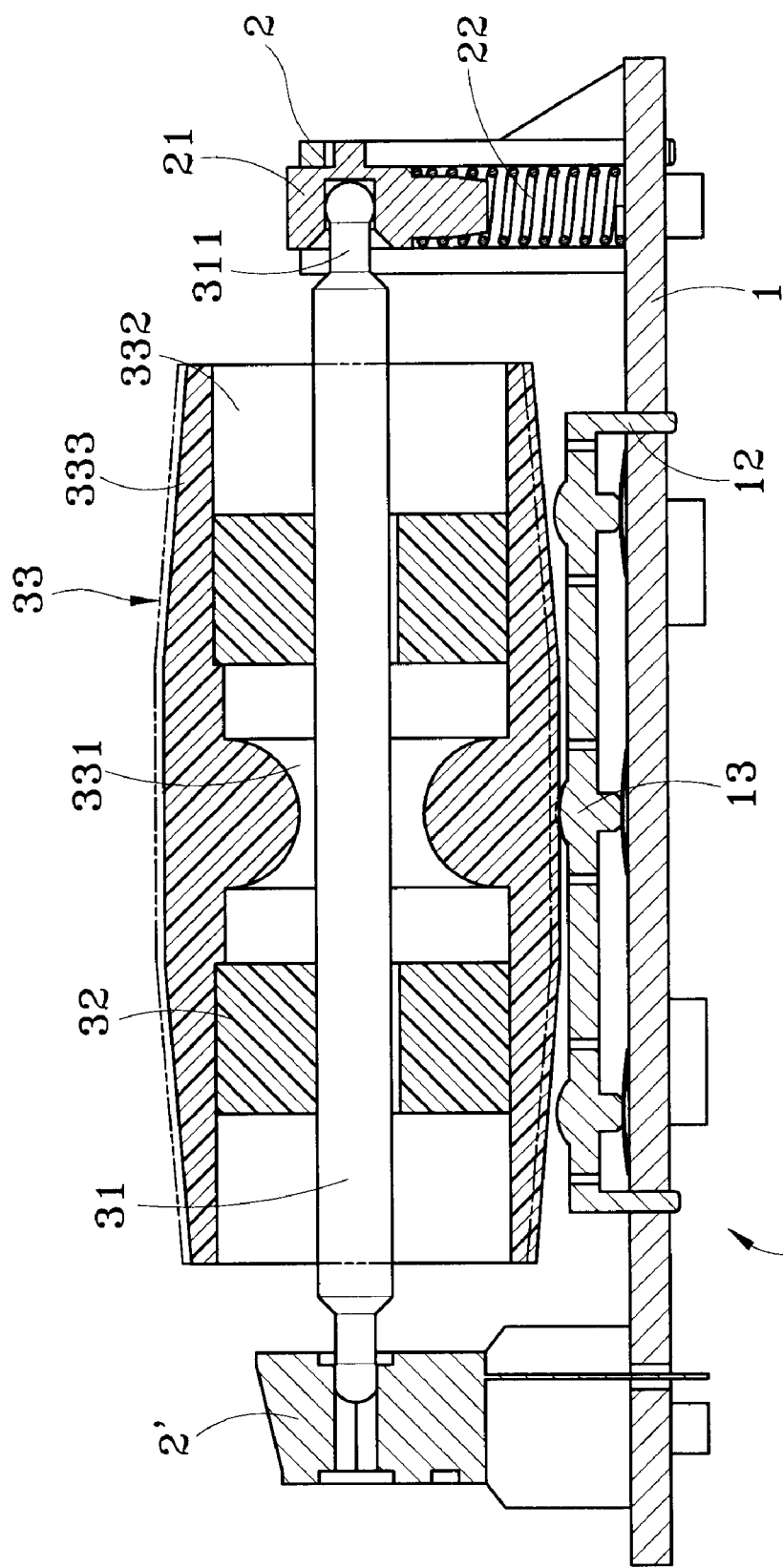
FIG. 5 is a schematic view of the invention in an operating condition according to FIG. 4.

Refer to FIGS. 4 and 5 for operations of the invention according to FIGS. 1 and 4. When the sleeve member 33 is driven, the two elastic elements 32 and the axle 31 are also being driven to rotate. When the axle 31 rotates, the coding device 2' outputs a coding signal which controls desired function selection or switching on the window. When to perform execution or opening of the selected function, depress the sleeve member 33 in the middle section thereof. The two elastic elements 33 are deformed to allow the middle section of the sleeve member 33 to press the switch 13 located in the middle portion of the switch seat 12, and a signal for execution or opening of the selected function will be generated and output through the circuit board 1 to perform the desired execution or opening of the selected function. As the compression sections 333 at two ends of the sleeve member 33 are tapered off, when the middle section of the sleeve member 33 is depressed and moved downwards, the compression sections 333 at two ends of the sleeve member 33 do not touch the switches 13 located on two sides of the switch seat 12, therefore wrong signals are prevented from incurring or outputting.

When an user's finger is moved away from the surface of the sleeve member 33 of the rolling axle 3, the elastic force of the two elastic elements 32 immediately restores the rolling axis 3 to its original position.

Figure 6:
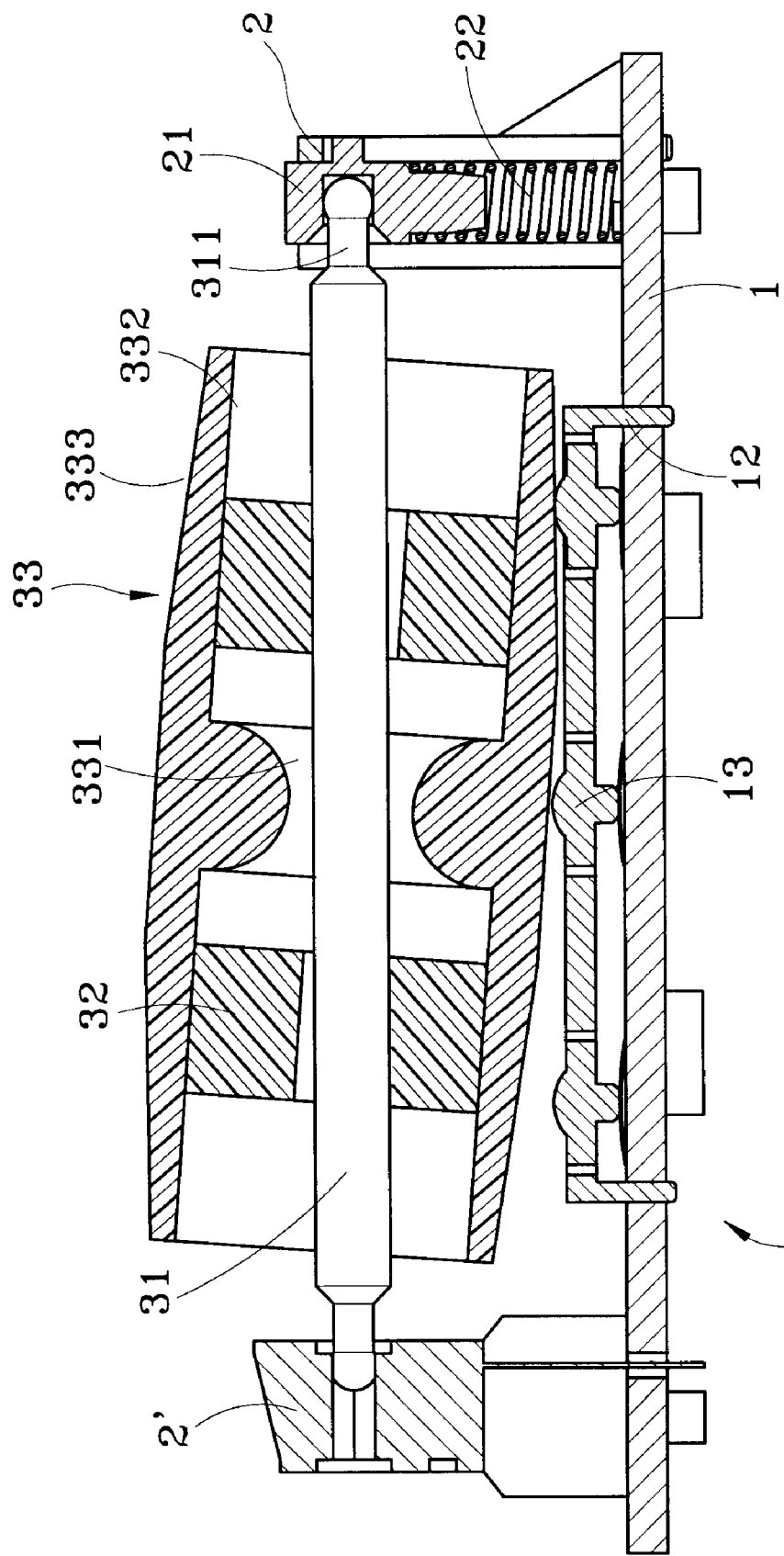
FIG. 6 is a schematic view of the invention in another operating condition according to FIG. 4.

Refer to FIG. 6 for another operating condition of the invention according to FIG. 4. When the compression section 333 located on either end of the sleeve member 33 is being depressed downwards, the sleeve member 33 is tilted to one side, and one of the elastic elements 32 is deformed to allow the compression section 333 at the tilted end to press the switch 13 located on the circuit seat 12 corresponding to the tilted end. Then circuit board 1generates an output signal to execute or open the selected function. As the compression sections 333 at two ends of the sleeve member 33 are tapered off, when either end of the sleeve member 33 is depressed and moved downwards, only the switch 13 of the switch seat 12 on the tilted end is compressed while the switch 13 located in the middle section of the switch seat 12 will not be touched.

When an user's finger is moved away from the surface of the sleeve member 33 of the rolling axle 3, the elastic force of the elastic elements 32 in the sleeve 33 immediately restores the rolling axis 3 to its original position.

Figure 7:
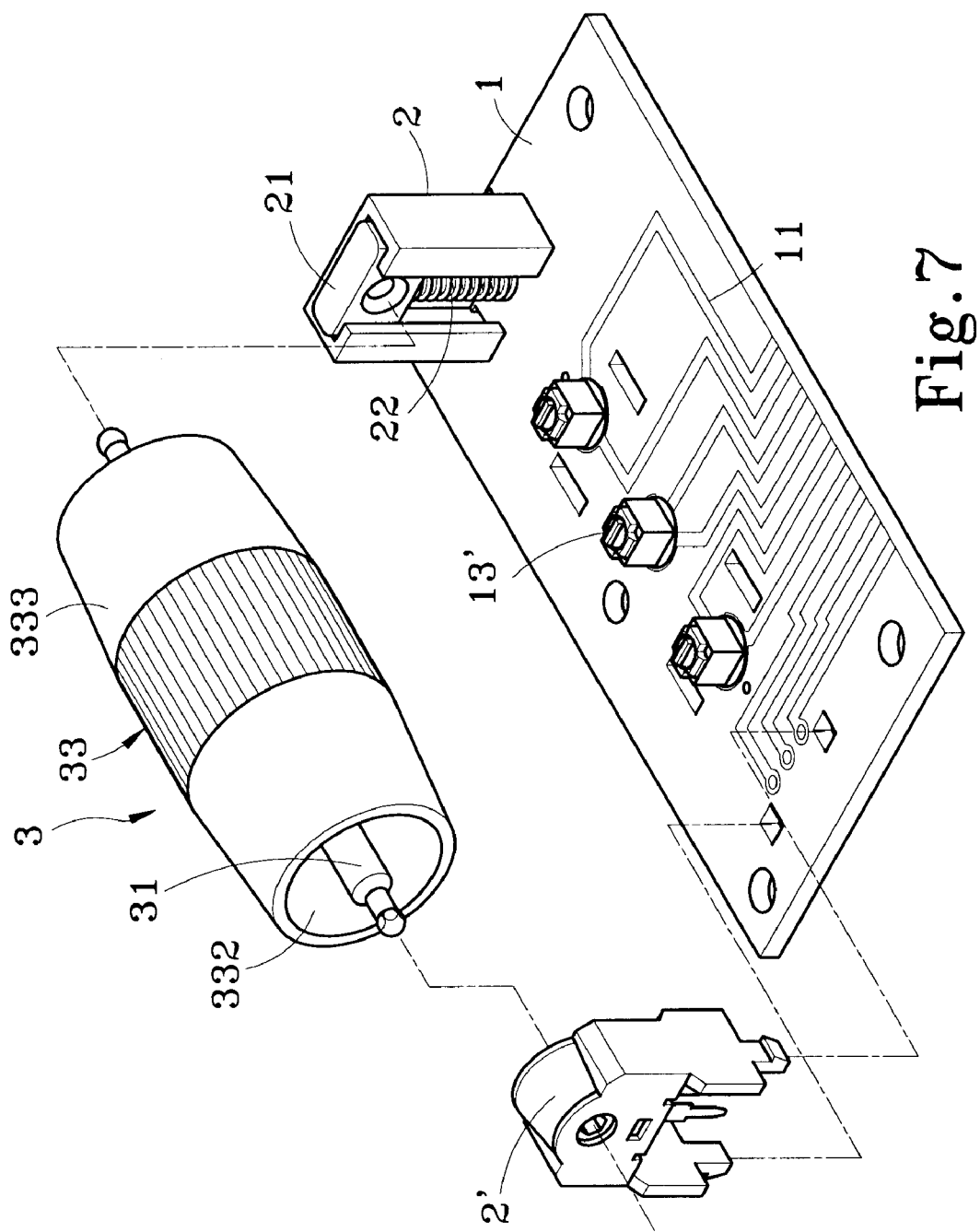
FIG. 7 is an exploded view of another embodiment of the invention.

Refer to FIG. 7 for another embodiment of the invention. It is largely constructed like the one set forth above. The difference is that the switch seat 12 is replaced by a plurality of individual switches 13', thus a separate switch seat 12 may be omitted to save production costs.

Figure 8:
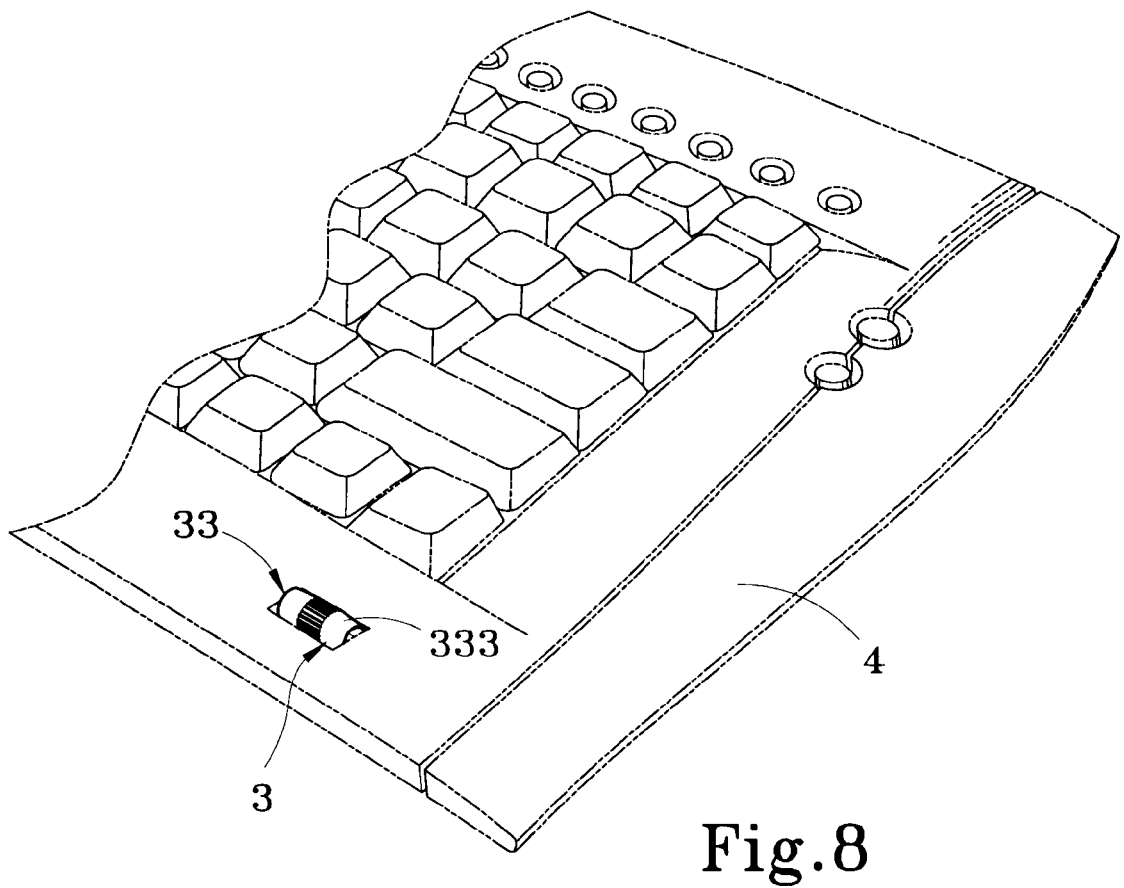
FIG. 8 is a schematic view of yet another embodiment of the invention.

Refer to FIG. 8 for yet another embodiment of the invention. As the modular rolling axis apparatus of the invention can be made in a small size and light weight, it may be installed in any location of a keyboard (or keypad) 4. Hence the keyboard 4 or keypad, in addition to the original button key operation and function, can also provide control function of a mouse device.

Figure 9:
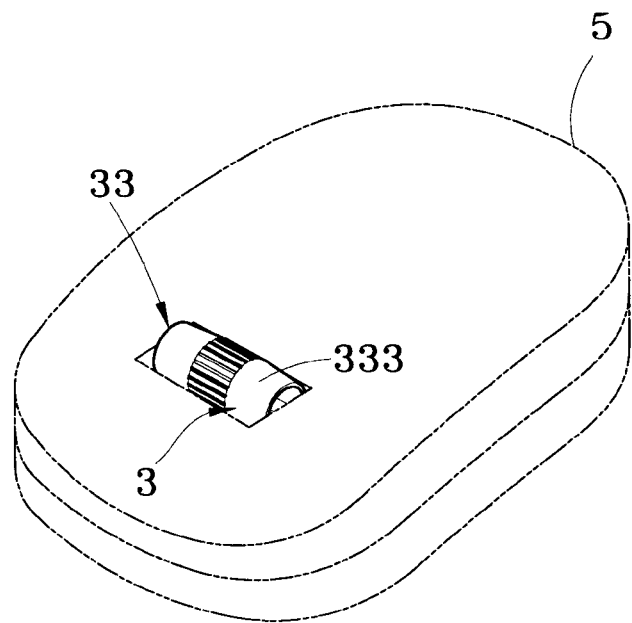
FIG. 9 is a schematic view of still another embodiment of the invention.

Refer to FIG. 9 for still another embodiment of the invention. As shown in the drawing, besides installing in a keyboard, the modular rolling axis 3 of the invention may also be installed on a mouse device 5 (digital type, electronic type or mechanical type). Hence the modular rolling axis 3 can replace the original button key or track ball on the mouse device 5 to make user operation more convenient. Fabrication of switches and button keys on the shell of the mouse device 5 can also be saved. Hence, besides to make the operation control device of the mouse 5 easier to produce, production costs can also be greatly reduced.

Figure 10:
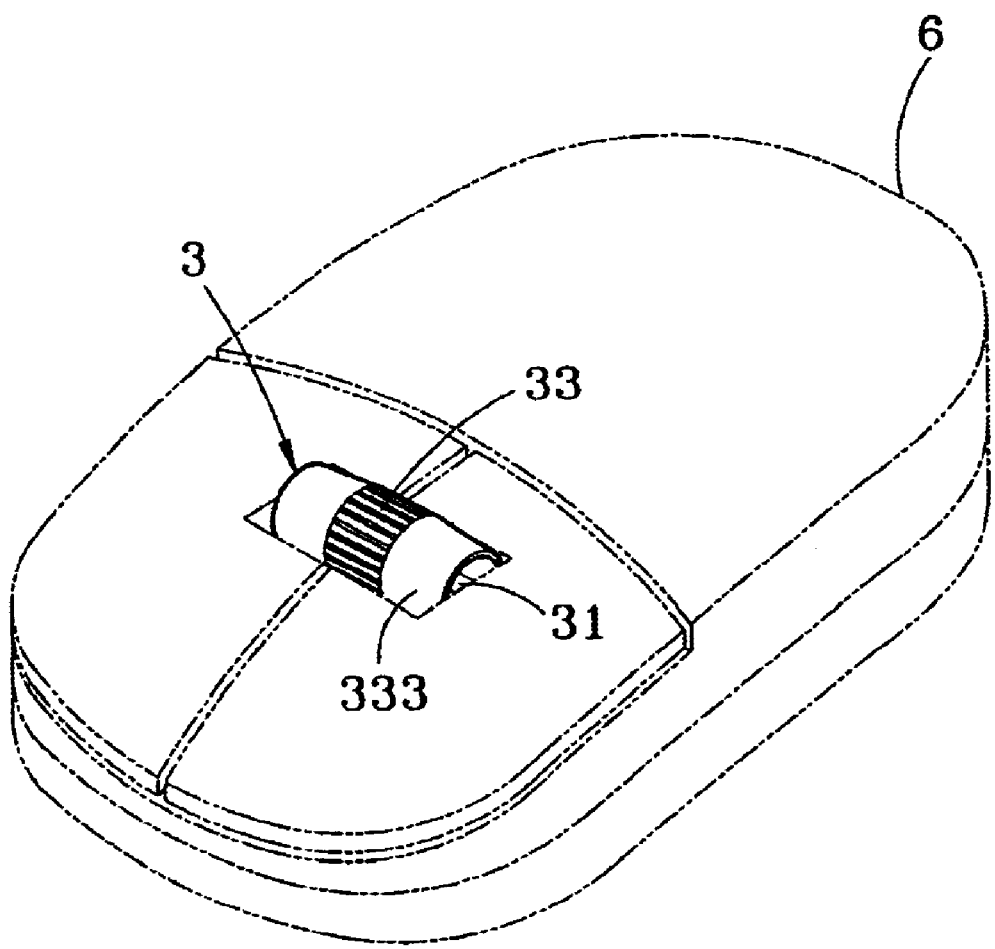
FIG. 10 is a schematic view of a further embodiment of the invention.

Refer to FIG. 10 for a further embodiment of the invention. As shown in the drawing, the modular rolling axis 3 of the invention may also be installed in a conventional mouse device 6 to allow the mouse 6, in addition to providing original operational function, can also control scrolling function on the window, thus makes user operation easier.

Furthermore, the modular rolling axis apparatus of the invention, in addition to installing on the mouse device 5 or 6, or the keyboard 4, may also be installed on computer peripheral devices such as joysticks, remote controllers, mobile phones, notebook computers, handheld computers, or the likes.

What is claimed is:

1. A modular rolling axis apparatus for installing in a computer peripheral device including a keyboard, a mouse device, a joystick, a remote controller, a mobile phone, a notebook computer, or a handheld computer, comprising:

a circuit board having a plurality of switches located thereon;

two support elements mounted to the circuit board and located on two sides of the switches; and a rolling axis including an axle pivotally engaging with the two support elements, two elastic elements coupling with the axle, and a sleeve member housing the axle and the elastic elements, the sleeve member having an opening formed in the center thereof to engage with the axle, two housing spaces located at two sides adjacent to the elastic elements, and two exterior tapered ends formed respectively a compression section;

wherein when the rolling axis is driven, one of the support elements outputs a coding signal for controlling function selection or switching on a window, and when the rolling axis is depressed to compress the switch located in the middle or two sides, a signal for processing execution or opening of the selected function is output to process the execution or opening of the selected function.

2. The modular rolling axis apparatus of claim 1, wherein the circuit board has a transmission circuit.

3. The modular rolling axis apparatus of claim 1, wherein the switches are located in a seat.

4. The modular rolling axis apparatus of claim 1, wherein the switches are individually mounted to the circuit board.

5. The modular rolling axis apparatus of claim 1, wherein one of the support elements is a coding device.

6. The modular rolling axis apparatus of claim 1, wherein one of the support elements is hollow and houses a pivotal section and a resilient element therein.

7. The modular rolling axis apparatus of claim 1, wherein the axle has two free ends each forming a pivotal connection end.

8. The modular rolling axis apparatus of claim 1, wherein the elastic elements are selectively made from rubber or cotton material.

* * * * *